United States Patent [19]

Nakayama et al.

[11] Patent Number: 4,599,266
[45] Date of Patent: Jul. 8, 1986

[54] MAGNETIC RECORDING MEDIUM

[75] Inventors: Masatoshi Nakayama; Haruyuki Morita; Yasumichi Tokuoka; Toshiaki Izumi, all of Saku; Kazumasa Fukuda; Yuichi Kubota, both of Komoro, all of Japan

[73] Assignee: TDK Corporation, Tokyo, Japan

[21] Appl. No.: 713,562

[22] Filed: Mar. 18, 1985

Related U.S. Application Data

[63] Continuation of Ser. No. 504,643, Jun. 15, 1983, abandoned.

[30] Foreign Application Priority Data

Jun. 18, 1982 [JP] Japan .................. 57-103926

[51] Int. Cl.$^4$ .................................... G11B 5/72
[52] U.S. Cl. .................... 428/336; 360/134; 360/135; 360/136; 427/41; 427/131; 427/132; 427/128; 428/694; 428/695; 428/900; 428/447
[58] Field of Search ............... 428/695, 694, 447, 900, 428/336; 427/41, 128, 131, 132; 360/134–136

[56] References Cited

U.S. PATENT DOCUMENTS

| | | | |
|---|---|---|---|
| 4,096,315 | 6/1978 | Kubacki | 428/447 |
| 4,131,717 | 12/1978 | Hirano | 428/447 |
| 4,137,365 | 1/1979 | Wydevan | 428/412 |
| 4,171,399 | 10/1979 | Allen | 428/695 |
| 4,336,310 | 6/1982 | Okuyama | 428/695 |
| 4,395,435 | 7/1983 | Sampei | 427/41 |
| 4,416,947 | 11/1983 | Yoda | 428/695 |
| 4,419,404 | 12/1983 | Arai | 427/131 |
| 4,429,024 | 1/1984 | Ueno | 428/694 |
| 4,551,778 | 11/1985 | Arai | 427/41 |
| 4,565,734 | 1/1986 | Arai | 427/131 |

Primary Examiner—Ellis P. Robinson
Attorney, Agent, or Firm—Seidel, Gonda, Goldhammer & Abbott

[57] ABSTRACT

A magnetic recording medium is coated, over its magnetic layer, with a thin film of a siloxane-linkage-containing polymer. The magnetic layer consists of a thin film formed by vacuum evaporation or sputtering or by dispersion of a ferromagnetic metal powder in a binder. The polymer having the siloxane linkage is prepared by polymerizing an organo-silicon compound which either inherently possesses the linkage or is capable of producing it. The polymerization is preferably effected by the plasma polymerization technique.

13 Claims, 2 Drawing Figures

MAGNETIC RECORDING MEDIUM

This application is a continuation of application Ser. No. 504,643, filed June 15, 1983, now abandoned.

BACKGROUND OF THE INVENTION

This invention relates to a magnetic recording medium, and more specifically to such a medium formed with a top coat in the form of a thin film of a polymer having the siloxane linkage to attain low friction, running stability, durability, corrosion resistance, and other desirable properties.

Considerable time has passed since magnetic recording media were first introduced consisting of a nonmagnetic base formed with a magnetic layer chiefly of a binder and a magnetic powder of an oxide, such as $\gamma$-$Fe_2O_3$, $\gamma$-$Fe_3O_4$, or Co-doped $\gamma$-$Fe_2O_3$. Recently, media for higher density recording with a coat composed of a binder and a ferromagnetic powder, such as Fe, Co, Ni, Fe—Co, Co—Ni, Fe—Co—Ni, Fe—Co—B, Fe—Co—Cr—B, Mn—Bi, Mn—Al, or Fe—Co—V, have come into use. More recently, those having a magnetic coat of either an evaporated metal deposit or a film formed by the sputtering technique are attracting increasing attention.

The magnetic recording media, above all those used as magnetic tapes and discs, are required to be low in friction coefficient, capable of running smoothly and stably, resistant to wear, stable in performance over an extended period of service, changeable little in properties, and accurately reproducible at any time under given ambient conditions. They are required to have durability and long life.

Aside from these requirements, surface leveling is under study for the magnetic recording media that use a feromagnetic layer for high density recording or have a film formed by vacuum evaporation or sputtering. Because of a tendency toward higher friction coefficients, some countermeasures have to be taken to ensure smooth, stable runs of the media. Another problem with those media is the possibility of deterioration due to corrosion of the metal particles exposed from the coats. Thus, there is particularly strong demand for magnetic recording media with greater running stability, smoothness, and durability than known heretofore so that the information recorded in high density can be stored for long periods and reproduced reliably and faithfully at any time desired.

With those media it has been customary to use silicone oil or other lubricant by either mixing it, with kneading, in the magnetic coating material or by applying it over the magnetic layer. Top coating the magnetic layer with a thin film suited for particular purposes is also utilized in modern practice. The conventional methods have, however, proved unsatisfactory because the lubricants are difficult to mix with or apply on the magnetic coats uniformly, and the lubricating and other effects attained are short-lived, decreasing with use. Further, an increased film thickness leads to an output drop due to spacing loss. Forming a thin, durable coat capable of achieving the desired effects has, therefore, been extremely difficult.

In view of the foregoing disadvantages of the prior art, the present invention has for its object the provision of a magnetic recording medium in general, particularly a high density recording medium, having a novel thin-film top layer which possesses low friction, running stability, durability, corrosion resistance, etc. so as to impart the medium with such improved surface properties.

To this end, it has now been found that a thin film of a polymer having the siloxane linkage exhibits outstandingly advantageous effects. It has also been found that, while it may be formed by heat polymerization or the like, the film achieves even better effects when it is deposited by plasma polymerization on the magnetic layer of a magnetic recording medium. The plasma polymerization produces a film which is as thin as 5 to 1000 Å and yet provides a protective effect and brings the abovementioned improvements in surface properties of the recording medium. Thus any output drop of the medium because of spacing loss is precluded, to great advantage. Since plasma polymerization is a gas-phase reaction, the reaction gas readily gains entrance into minute recesses on the surface of the magnetic layer. Examination under an electron microscope reveals that very small pinholes on the surface are filled up with the gas. This phenomenon appears to play an important role in improving the corrosion-resistant effect of the medium. The plasma polymerization, which makes possible high-speed, continuous film formation, can be easily incorporated into the process for manufacturing the magnetic recording medium, without impairing its productivity.

The thin film of a polymer having the siloxane linkage remarkably improves the surface properties of the medium without in any way sacrificing its magnetic or electric properties or its recording density characteristic. This is a markedly significant advantage of the film over those of the prior art.

DETAILED DESCRIPTION

Figure 1:
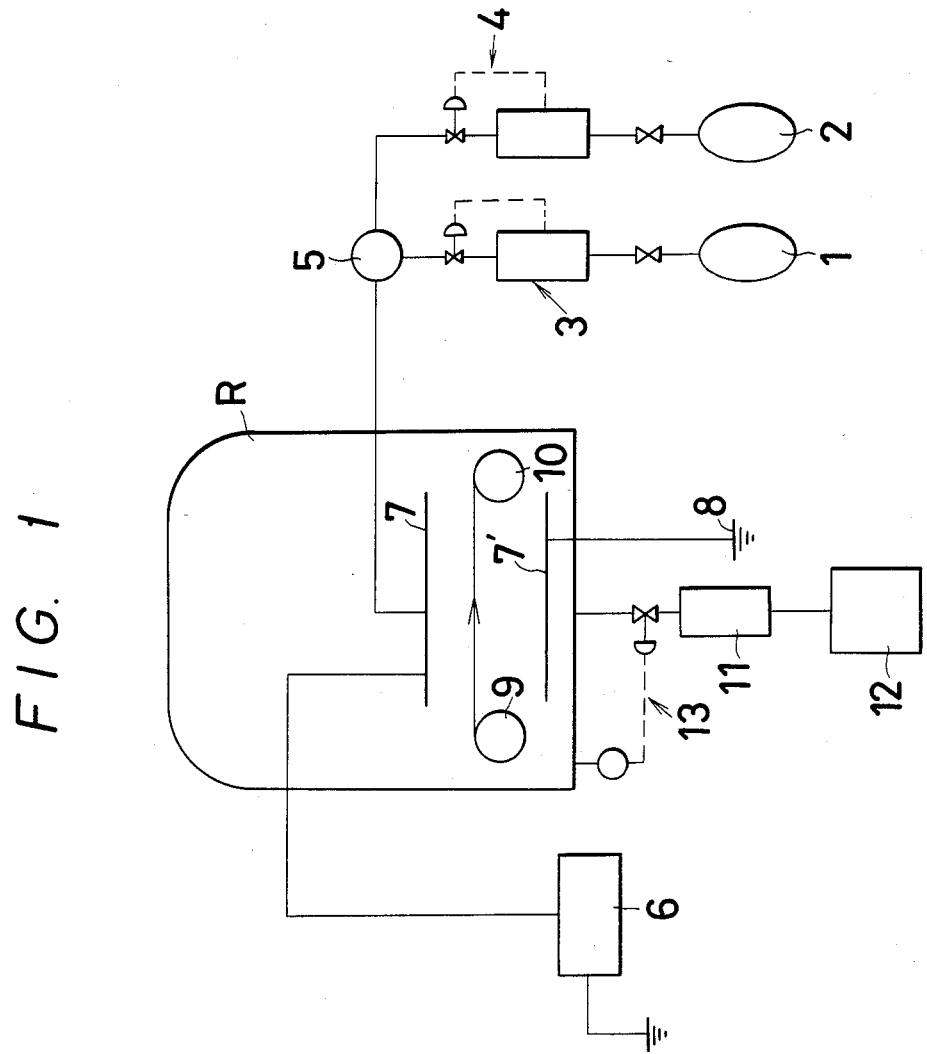
FIG. 1 is a schematic diagram of a high-frequency-wave discharge plasma polymerizer for producing a thin film for the magnetic recording medium according to the invention.

The thin film of the siloxane-linkage-containing polymer can be formed by polymerizing either an organosilicon compound having the siloxane linkage or an organosilicon compound, such as any of silanes, that can develop the siloxane linkage upon polymerization. The practice of the invention favors the adoption of a compound capable of giving a thin film of a polymer which will develop the siloxane linkage on plasma polymerization. Examples of those substances are as follows:

Tetramethoxysilane, tetraethoxysilane, octamethylcyclotetrasiloxane, hexamethylcyclosiloxane, hexamethoxydisiloxane, hexaethoxydisiloxane, triethoxyvinylsilane, dimethylethoxyvinylsilane, trimethoxyvinylsilane, methyltrimethoxysilane, dimethoxymethylchlorosilane, dimethoxymethylsilane, trimethoxysilane, dimethylethoxysilane, trimethoxysilanol, hydroxymethyltrimethylsilane, methoxytrimethylsilane, dimethoxydimethylsilane, ethoxytrimethoxysilane, bis(2-chloroethoxy)methylsilane, acetoxytrimethylsilane, chloromethyldimethylethoxysilane, 2-chloroethoxytrimethylsilane, ethoxytrimethylsilane, diethoxymethylsilane, ethyltrimethoxysilane, tris(2chloroethoxy)silane, dimethoxymethyl-3,3,3-trifluoropropylsilane, 1-chloromethyl-2-chloroethoxytrimethylsilane, allyloxytrimethylsilane, ethoxydimethylvinylsilane, isoprophenoxytrimethylsilane, 3-chloropropyldimethoxymethylsilane, chloromethyldiethoxymethylsilane, triethoxychlorosilane, 3-chloropropyltrimethoxysilane, diethoxydimethylsilane, dimethoxy-3-mercaptopropylmethylsilane, triethoxysilane, 3-mercaptopropyltrimethoxysilane, 3-aminopropyltrimethoxysilane, diethoxymethylvinylsilane, chloromethyltriethoxysilane, tert-butoxytrimethylsilane, butyltrimethoxysilane, methyltriethoxysilane, 3-(N-methylaminopropyl)triethoxysilane, diethoxydivinylsilane, diethoxydiethylsilane, ethyltriethoxysilane, 2-mercaptoethyltriethoxysilane, 3-aminopropyldiethoxymethylsilane, p-chlorophenyltriethoxysilane, phenyltrimethoxysilane, 2-cyanoethyltriethoxysilane, allyltriethoxysilane, 3-chloropropyltriethoxysilane, 3-allylaminopropyltrimethoxysilane, propyltriethoxysilane, hexatrimethoxysilane, 3-aminopropyltriethoxysilane, 3-methylacryloxypropyltrimethoxysilane, methyltris(2-methoxyethoxy)silane, diethoxymethylphenylsilane, p-chlorophenyltriethoxysilane, phenyltriethoxysilane, tetraallyloxysilane, tetrapropoxysilane, tetraisopropoxysilane, dimethoxydiphenylsilane, diethoxydiphenylsilane, tetraphenoxysilane, 1,1,3,3-tetramethyldisiloxane, hexamethyldisiloxane, octamethyltrisiloxane, 1,1,1,-3,5,5,5-heptamethyltrisiloxane, hexaethylcyclotrisiloxane, and 1,3,5-trimethyl-1,3,5-triphenylcyclotrisiloxane.

The process of plasma polymerization consists of mixing discharged plasma of a carrier gas, e.g., Ar, He, $H_2$, or $N_2$, with a monomer gas, and bringing the mixed gas into contact with the surface of the base to form a plasma-polymerized film thereon. In principle an electric field is applied to the gas kept at a low pressure, and the free electrons present in a small amount in the gas are subjected to an electric field acceleration because of the much larger intermolecular distance than experienced under ordinary pressure. The electrons acquire a kinetic energy (electron temperature) of 5 to 10 eV. As the atoms at this velocity collide with other atoms or molecules, they break the atomic or molecular orbital and dissociate the latter into normally unstable chemical species, such as electrons, ions, and neutral radicals. The dissociated electrons are again subjected to the electric field acceleration to dissociate, in turn, other atoms and molecules. This chain reaction quickly changes the gas to a highly ionized state, or to the form known as plasma gas. With few chances of collision with electrons, the gas molecules absorb little energy and are kept at a temperature close to the ordinary level. The system in which the kinetic energy of electrons (electron temperature) and the thermal motion of the molecules (gas temperature) have been separated is called a low temperature plasma. The chemical species retain comparatively much of their original forms and are in conditions ready for an additive chemical reaction, such as polymerization. The present invention contemplates taking advantage of the above conditions in forming a plasma-polymerized film over a base. Thanks to the adoption of the low temperature plasma, there is no unfavorable thermal effect upon the base.

Figure 2:
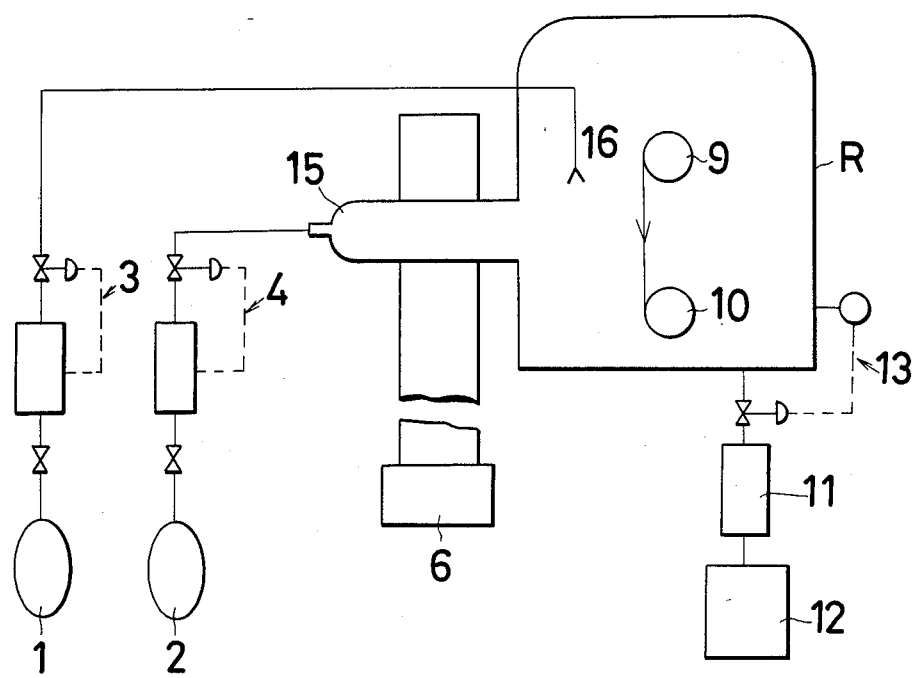
FIG. 2 is a schematic diagram of a microwave discharge plasma polymerizer for the same purpose as above.

Referring now to FIGS. 1 and 2, there are shown typical apparatuses for forming a thin polymer film by plasma polymerization on the surface of a magnetic recording medium. FIG. 1 schematically illustrates a plasma polymerizer that depends on high-frequency discharge, and FIG. 2, a plasma polymerizer that uses microwave discharge.

FIG. 1 shows a polymerization reaction vessel R which is supplied with a monomer gas from its source 1 and a carrier gas from its source 2 through mass flow controllers 3, 4, respectively, after mixing by a mixer 5. The monomer gas, or the material to be polymerized in the reaction vessel, is chosen in accordance with the invention from among the organosilicon compounds having siloxane bonds or capable of forming the bonds upon plasma polymerization. The carrier gas is suitably chosen from Ar, He, $H_2$, $N_2$, etc. The monomer gas is fed at a flow rate in the range of 1 to 100 ml/min and the carrier gas in the range of 50 to 500 ml/min. Inside the reaction vessel R are installed means for supporting the magnetic recording medium to be treated, the means in the arrangement shown being a supply roll 9 and a takeup roll 10 for a magnetic tape. Depending on the form of the medium to be handled, various other support means may be employed including, for example, stationary rotating supporters. A pair of electrodes 7, 7' are disposed horizontally in parallel, along the passage for the magnetic tape in between. One electrode 7 is connected to a high-frequency power source 6 and the other electrode 7' is grounded at 8. The vessel R is further equipped with a vacuum system for its evacuation, which comprises a liquid nitrogen trap 11, a rotary oil-seal pump 12, and a vacuum controller 13. This vacuum system maintains a vacuum degree of 0.01 to 10 Torr inside the vessel.

In operation, the reaction vessel R is first evacuated by the rotary oil-seal pump to a degree higher than $10^{-3}$ Torr, and is supplied with the monomer gas and the carrier gas at predetermined flow rates in a mixed state. The degree of vacuum in the vessel is controlled within the range of 0.01 to 10 Torr. At the point the magnetic tape speed and the flow rates of the monomer and carrier gases have become steady, the high-frequency power source is switched on. Then, a plasma-polymerized film is deposited on the traveling magnetic recording medium.

FIG. 2 illustrates a microwave-discharge plasma polymerizer, with the parts like those in FIG. 1 given like symbol or numbers. Here the reaction vessel R is formed with a discharge plasma chamber 15 protruding horizontally from one side of the vessel to be supplied at the outermost end with the carrier gas from the source 2. The carrier gas fed to the chamber is ionized to a plasma by the oscillation of a magnetron and is stabilized as such. The monomer gas is introduced into the reaction vessel through a nozzle 16 open near the inner end of the plasma chamber 15. Aligned with the plasma chamber 15, support means are mounted in the vessel as comprising a set of supply and takeup rolls 9, 10 disposed in a vertically spaced relationship. Other elements are the same as those used in FIG. 1.

For the plasma source, DC or AC discharge may be utilized as well as the high-frequency or microwave discharge so far described. In the DC and AC discharge, the plasma polymerization may be carried out by interior-electrode procedure.

As noted above, the thin film of a siloxane-linkage-containing polymer formed by the plasma polymerization confers low friction, or a property derivable from the siloxane linkage, on the magnetic layer. In addition, the tridimensionally developed polymer structure provides great durability and most solid adhesion to the underlying layer, protecting the latter against corrosion.

The invention is illustrated by the following examples in which plasma-polymerized thin films were formed on varied samples of magnetic recording media by use of the polymerizers shown in FIGS. 1 and 2.

EXAMPLE 1

Using an ingot consisting of 8 parts Co and 2 parts Ni, a 10 μm-thick base film was coated by oblique vacuum vapor deposition with a thin film 0.1 μm thick as a magnetic layer. Onto this magnetic tape a plasma-polymerized thin film based on vinyltrimethoxysilane as a monomer gas was deposited. The apparatus shown in FIG. 1 was employed. The conditions for the plasma polymerization were as below:

| | |
|---|---|
| Monomer gas flow rate | 15 ml/min |
| Carrier gas | Argon |
| Carrier gas flow rate | 50 ml/min |
| Degree of vacuum | 0.5 Torr |
| High-frequency power supply | 13.56 MHz, 200 W |
| Magnetic tape speed | 30 m/min |

EXAMPLE 2

On the apparatus of FIG. 2 a polymer film was formed by microwave-discharge plasma polymerization of hexamethylsiloxane on a magnetic tape having a magnetic layer of a ferro-magnetic Fe—Co alloy powder and a binder.

The magnetic tape was made in the following way. A composition consisting of

| | |
|---|---|
| Fe—Co metal powder | 100 parts |
| abrasive (Al$_2$O$_3$) | 3 parts |
| nitrocellulose | 6 parts |
| epoxy resin (trade name "Epikote 1004") | 4 parts |
| polyurethane (trade name "Nippollan 5033") | 10 parts |
| solvent | 250 parts | was dispersed by a sand mill for 5 hours. After the addition of 4 parts isocyanate ("Coronate L"), the mixture was applied, while being magnetically oriented, on a 14 μm-thick base film of polyester, and in the usual manner a magnetic tape was made.

Next, the reaction vessel R and the discharge plasma chamber 15 were evacuated by the rotary oil-seal pump 12 having an evacuation capacity of 1000 liters per minute to a pressure lower than $10^{-3}$ Torr. As the carrier gas, argon was supplied at a rate of 100 ml/min. The degree of vacuum in the reaction vessel was kept at 0.5 Torr by the vacuum controller 13. An electric power of 500 W at a frequency of 2450 MHz under the oscillation by the magnetron 6 was applied, and the plasma was stabilized. Then, hexamethylsiloxane was fed to the nozzle 16 at a flow rate of 25 ml/min. The magnetic tape was transferred from the supply roll 9 to the takeup roll 10 at a velocity of 3.0 m/min.

EXAMPLE 3

Under the same conditions as used in Example 1, a thin film of a siloxane-linkage-containing polymer was formed on a magnetic tape, with the exception that the magnetic layer was formed by sputtering of a Co—Ni (95% Co-5% Ni) alloy powder to the thickness of 0.1 μm on the 10 μm-thick polyester film.

The thin films formed in Examples 1 to 3 were examined as to their compositions with a Fourier-transformation infrared spectrophotometer, ESCA, and they were confirmed to be the films of polymers having siloxane bonds. The film thicknesses were measured by the multiple-beam interferometry and with an ellipsometer to be 55 Å for the films of Examples 1, 3 and 25 Å for the Example 2 film.

COMPARATIVE PERFORMANCE TESTS

Samples of the magnetic tapes treated in Examples 1 to 3 and samples of untreated tapes were tested for the following three performance factors:

(A) Kinetic friction coefficient, $\mu_k$

The kinetic friction coefficient, $\mu_k$, of each sample was determined by the method described in "SHINGAKU GIHO" (Technical Report of the Communications Society), R50-25 (1980). According to the method, the test tape is extended, with the magnetic coating layer inside, round an abrasion ring that simulates an ordinary magnetic head. A counterweight is suspended from one tape end, and the opposite end is fixed to a load cell. The abrasion ring is rotated and the frictional force of the magnetic tape is determined with the load cell. Let the frictional force be T, the weight of the counterweight be W, and the angle of tape extension round the ring be $\theta$, then the friction coefficient $\mu_k$ is found from the following equation:

$$\mu_k = \frac{1}{\theta} \ln \frac{T}{W}$$

The results of the comparative tests were as tabulated below:

| | $\mu_k$ |
|---|---|
| Example 1 tape | 0.23 |
| Untreated tape with evapotation-deposited layer | 0.60 |
| Example 2 tape | 0.19 |
| Untreated tape with ferromagnetic alloy powder layer | 0.35 |
| Example 3 tape | 0.22 |
| Untreated tape with sputtering-deposited layer | 0.55 |

It will be seen from the table that the magnetic recording medium according to this invention has a very low friction property, with the tape samples giving friction coefficient values less than half the values of the untreated tapes.

(B) STILL TIME

The tape samples were also tested for their still time characteristics, or the lengths of time during which they gave visible images upon playback on a video tape recorder.

The comparative test results were as follows:

| | Still time (min) |
|---|---|
| Example 1 tape | 45 |
| Untreated tape with evapotation-deposited layer | 5 |
| Example 2 tape | 60 |
| Untreated tape with ferromagnetic alloy powder layer | 15 |
| Example 3 tape | 70 |
| Untreated tape with | 10 |

|  | Still time (min) |
|---|---|
| sputtering-deposited layer | 5 |

The table shows that the invention permits remarkable improvements in friction resistance.

(C) Resistance to environmental deterioration

Tapes of this character are known to undergo deterioration of their magnetic properties due to oxidation. In order to determine the degree of deterioration, each sample of magnetic recording medium was allowed to stand in an environment at 50° C. and 98% RH for 72 hours. With the aid of an oscillating type magnetometer the change in the magnetic flux density of the sample was calculated from the formula $$\frac{Br' - Br}{Br} \times 100$$

where Br was the initial magnetic flux density and Br' was the density after the test.

The results of the comparative tests are shown in the following table, the values being based on those of the untreated tapes which were 1.00.

|  | Change in mag. flx. dens. |
|---|---|
| Example 1 tape | 0.25 |
| Untreated tape with evapotation-deposited layer | 1.00 |
| Example 2 tape | 0.38 |
| Untreated tape with ferromagnetic alloy powder layer | 1.00 |
| Example 3 tape | 0.56 |
| Untreated tape with sputtering-deposited layer | 1.00 |

The table clearly indicates the excellent durability and corrosion resistance of the magnetic recording medium of the invention.

EXAMPLE 4

A magnetic layer according to Example 1 was deposited by evaporation on a film based on a polypyromelitimide marketed by Du Pont (E. I.) de Nemours & Co. under the trade designation "Kapton". The magnetic layer was coated with a triethoxyvinylsilane solution, and heat polymerization was carried out at 150° C. for 2 hours.

EXAMPLE 5

A 14 μm-thick "Kapton"-base film was metal-coated in the same manner as in Example 2, and a triethoxyvinylsilane solution was applied on the resulting magnetic tape and then heat polymerized at 150° for 2 hours.

EXAMPLE 6

A 10 μm-thick "Kapton"-base film was coated with a magnetic film by sputtering as described in Example 3. A triethoxyvinylsilane solution was applied on the magnetic layer and heat polymerized at 150° C. for 2 hours.

In Examples 4, 5 and 6 the concentrations of the triethoxyvinylsilane solutions were so adjusted that the resulting thin films had the same thicknesses as those of Examples 1, 2 and 3, respectively.

|  | $\mu_k$ | Still time (min) | Change in mag. flx. dens. |
|---|---|---|---|
| Untreated tape | — | — | 1.00 |
| Example 4 | 0.30 | 3 | 0.90 |
| Example 5 | 0.25 | 20 | 0.95 |
| Example 6 | 0.30 | 8 | 1.00 |

The thin films in Examples 4, 5 and 6 were all confirmed to have cured on polymerization, but they nevertheless failed to be as effective as the films formed by plasma polymerization. This is because plasma polymerization makes the reaction gas permeable enough to form a pinhole-free film, as contrasted with the inferior film by heat polymerization. Another factor believed to be contributory to this marked distinction is the fact that the plasma-polymerized film adheres so strongly to the base that both form a tridimensional structure. Also, the analyses with the Fourier-transformation infrared spectrophotometer, ESCA, made it clear that the heat polymerization caused the ethoxy groups to remain in the polymer whereas the plasma polymerization allowed the siloxane linkage to be present in the product. As will be appreciated from Examples 4, 5 and 6, the double-bond-containing monomer is applicable to heat polymerization but the protective film it forms is much inferior in properties to the plasma-polymerized films. Monomers having no double bond are difficult to polymerize other than by the plasma polymerization technique.

As has been described hereinbefore, the present invention fully meets and will meet requirements which are becoming more and more stringent for the quality and durability of various magnetic recording media, by forming thereon thin films utterly dissimilar to those made heretofore.

What is claimed is:

1. A magnetic recording medium comprising a base, a magnetic layer formed thereon consisting essentially of a metal or a metal with a binder, and a thin film of a polymer having a siloxane linkage, said thin film formed by a plasma polymerization means so as to cover said magnetic layer.

2. The medium according to claim 1 wherein said magnetic layer consists of a thin film formed by a means selected from the group consisting of vacuum evaporation, sputtering and dispersion of a ferromagnetic metal powder in a binder.

3. The medium according to claim 1 wherein said polymer having a siloxane linkage is prepared by polymerizing an organosilicon compound which either inherently possesses the linkage or is capable of producing the same.

4. The medium according to claim 1 having a frictional coefficient of less than 0.30.

5. The medium according to claim 2 wherein said polymer having a siloxane linkage is prepared by polymerizing an organosilicon compound which either inherently possesses the linkage or is capable of producing the same.

6. The medium according to claim 1 wherein the thickness of the polymer film is from about 5 Å to about 1000Å.

7. The medium according to claim 1 wherein the plasma polymerization means includes high-frequency-waive discharge.

8. The medium according to claim 1 wherein the plasma polymerization means includes microwaive discharge.

9. A process for forming a low-friction siloxane polymer on a magnetic recording medium comprising contacting a medium having a base and a magnetic layer formed thereon consisting essentially of a metal or a metal with a binder with a plasma of a monomer polymerizable to a siloxane polymer, and polymerizing said monomer to form a thin polymer film on the surface of said medium.

10. A process according to claim 9 wherein polymerization is by high-frequency discharge.

11. A process according to claim 9 wherein polymerization is by microwave-discharge.

12. A process according to claim 10 comprising the steps of injecting said monomer and a carrier gas into an evacuated reaction vessel maintained at a pressure of between about 0.01 and about 10 Torr, and contacting said monomer with a medium continuously conveyed between a pair of parallel energized electrodes to cause said monomer to polymerize on the surface of the medium.

13. A process according to claim 12 wherein the monomer is fed into the reaction vessel at a flow rate between about 1 and about 100 ml/mn and the carrier gas is fed into the reaction vessel at a flow rate between about 50 to about 500 ml/mn.

* * * * *